United States Patent Office 3,180,899
Patented Apr. 27, 1965

3,180,899
POLY(NITROCHLORO)ETHANES AND PREPARATION OF THE DIPOTASSIUM SALT OF TETRANITROETHANE
Paul Noble, Jr., Los Altos, and Wilmer L. Reed and Franklin G. Borgardt, San Jose, Calif., assignors to Lockheed Aircraft Corporation, Burbank, Calif.
No Drawing. Filed Apr. 18, 1962, Ser. No. 188,546
20 Claims. (Cl. 260—644)

This invention relates generally to the synthesis of nitro compounds and is specifically concerned with the preparation of the dipotassium salt of 1,1,2,2-tetranitroethane. The invention also concerns itself with processes and compounds which are intermediates in the preparation of the dipotassium salt of tetranitroethane.

The dipotassium salt of tetranitroethane has been found to be extremely valuable in view of its status as a precursor in the preparation of hexanitroethane, a valuable oxidizer particularly when used in connection with fuel materials in rocket engines, and the like. Hexanitroethane also has utility in connection with various chemical reactions, it being noted that in ether solution it will oxidize hydroquinone to quinone much more rapidly than will tetranitromethane. Hexanitroethane is also an explosive.

The dipotassium salt of tetranitroethane may be further nitrated to form hexanitroethane by conventional methods which will be set forth in detail hereinbelow. The dipotassium salt of tetranitroethane may also be utilized as an intermediate in the synthesis of other nitro oxidizers and nitro halogen compounds.

Hexanitroethane has always been an exceedingly expensive chemical due in part to the fact that there was no economical method by which it could be synthesized in large quantities. The applicants have discovered that the dipotassium salt of tetranitroethane, the important precursor to hexanitroethane, may be prepared by the chlorination of certain nitro alcohols, the products of which chlorination may then be easily nitrated to the desired dipotassium salt of tetranitroethane. Important aspects of the invention herein defined and claimed relate to two specific new compositions of matter, i.e., 1,1,1-trinitro-2-chloroethane and 1,1-dinitro-1,2-dichloroethane, and the processes by which these chlorinated nitro alkanes are made.

Accordingly it is a primary objective of the present invention to provide a new process by which hexanitroethane may be more economically and safely manufactured, which process involves the preparation of the dipotassium salt of 1,1,2,2-tetranitroethane.

It is a further object of the present invention to disclose two new compositions of matter, i.e., 1,1,1-trinitro-2-chloroethane and 1,2-dichloro-1,1-dinitroethane.

An additional object of our invention is to provide a practical process by which the chlorinated alkanes mentioned immediately hereinabove may be manufactured on an economical basis. In particular our invention involves the chlorination of 1,1,1-trinitro-2-hydroxyethane and 1-chloro-1,1-dinitro-2-hydroxyethane, but also applies to other similar alcohols wherein the nitro groups are on the carbon atom adjacent to that containing the hydroxy group. The trinitrochloroethane can also be formed using 1,1,1-trinitroethyl sulfite.

Another important object of our invention is to describe a process by which the two chlorinated nitro alkanes mentioned above may be readily transformed into the dipotassium salt of tetranitroethane. (It should be understood that other dimetallic salts such as the disodium salt of tetranitroethane are within the purview of the invention.)

1,1,1-trinitro-2-chloroethane is a utilitarian compound considered separate and distinctly from its utilization in connection with the manufacture of the dimetallic salts of tetranitroethane. In this respect it is a lachrymator, it has explosive qualities, and is also useful in explosive compositions. It is a plasticizer for use in connection with, for example, propellant or rocket grain compositions. It has a low melting point and is a colorless liquid at normal (room) temperatures. The material has a boiling point of between 109° C. and 110° C. at 60 millimeters of mercury pressure. The referactive index of a pure sample of 1,1,1-trinitro-2-chloroethane is $n_D^{25}$ 1.4651. The nuclear magnetic resonance spectrum showed a single line at 287 cps. with an intensity corresponding to 2 protons. The infrared spectrum was also consistent with the assigned structure. As to the analysis, the following is apropos. Calculated for $C_2H_2N_6O_6Cl$: C, 12.04; H, 1.01; Cl, 17.77. The following was found: C, 12.25; H, 0.97; Cl, 17.94.

1,1-dinitro-1,2-dichloroethane is also a lachrymator and, in addition, has also been found to be an excellent fumigant. It is a colorless liquid at room temperature and has a boiling point of approximately 45° C. to 47° C. at 5 millimeters of mercury. The refractive index of a pure sample of 1,2-dichloro-1,1-dinitroethane was $n_D^{25}$ 1.4677. The nuclear magnetic resonance spectrum showed a single line at 278 cps. with an intensity corresponding to two protons. The infrared spectrum was consistent with the assigned structure. For analysis the following is apropos. Calculated for $C_2H_2N_2O_4Cl_2$: C, 12.7; H, 1.07; N, 14.8; Cl, 37.5. The following was found: C, 13.41; H, 1.28; N, 14.73; Cl, 37.42.

As mentioned above, the method by which the dipotassium salt of 1,1,2,2-tetranitroethane may be transformed into hexanitroethane is known and consists primarily of the method formulated by W. Will reported in Berichte, vol. 47, page 961 (1914). An example of this method is as follows:

Example 1

The dry salt (19.6 gm.) of dipotassium tetranitroethane was added slowly to a 100 cc. of concentrated sulphuric acid cooled to −10° C. by means of a Dry Ice-acetone cooling bath. To the cold suspension of tetranitroethane is dropped with efficient stirring a nitrating mix consisting of 35 ml. of concentrated $H_2SO_4$ and 35 ml. of concentrated nitric acid (d. 1.52). Only a slight rise in temperature was noted. After the nitrating mix was added, the mixture was rapidly heated to 50° C.–60° C. by means of a hot water bath. At 40° C.–50° C. a white solid commenced precipitating. The temperature was maintained at 50° C.–60° C. for 15–30 minutes, cooled, and added to ice water precipitating more of the white solid. The white product was filtered and washed with 5 liters of cold water. A yield of 20.2 gm. of hexanitroethane (M.P. 140° C.–141° C.) (decomposes) was obtained. The product was recrystallized from methylene chloride. A yield of 19 gm. of a white crystalline product was obtained that melted at 150° C. (decomposes).

Another better method by which this nitration takes place is described and claimed in the commonly assigned co-pending application, Serial Number 80,693, filed January 4, 1961, now U.S. Patent No. 3,101,379. An example of this new process is as follows:

Example 2

To a vigorously stirred slurry of 19.6 gm. of dipotassium tetranitroethane in 50 ml. of methylene chloride was added dropwise 100 ml. of cold (−10° F.) concentrated sulfuric acid, maintaining the temperature at −10° C. to 0° C. during the addition. To this suspension was added the nitration mixture consisting of 35 ml.

of concentrated sulfuric acid and 35 ml. of concentrated nitric acid (d.=1.52). After the nitrating mix was added the reaction mixture was heated on a water bath to reflux the methylene chloride and maintained at reflux overnight. The methylene chloride was separated from the aqueous layer, treated with anhydrous magnesium sulfate and the methylene chloride cooled with Dry Ice-acetone to freeze out the hexanitroethane. The yield of hexanitroethane was between 18–20 gm.

Before proceeding with examples regarding the process of making trinitrochloroethane, it should be noted that it is applicants' knowledge that numerous scientists have been involved in attempts to prepare similar compounds but that the compound actually produced was the sulfite or phosphite ester of a nitroalkylol. Numerous colleagues and consultants to the applicants did not expect that 1,1,1-trinitro-2-chloroethane could be manufactured and applicants therefore have taken a great deal of satisfaction in view of the fact that they have not only produced, but have found a practical way to manufacture the 1,1,1-trinitro-2-chloroethane compound on an economic basis. Prior to our invention no method was available for the chlorination of the above-described alcohols because use of basic catalysts in the usual manner caused deformalation. According to our invention the alcohols described are treated with catalytic amounts of the hydrochloride of bases in the pyridine class. Among such compounds are: pyridine, alkylated pyridines, such as the picolines and lutidines, and quinoline.

In general the method employed in carrying out our invention consists of treating a solution of the alcohol in thionyl chloride with either anhydrous pyridine hydrochloride or a premixed solution of the anhydrous pyridine hydrochloride base in thionyl chloride wherein the pyridine base is complexed with the thionyl chloride prior to addition to the alcohol. The amount of catalyst used is preferably in the range of 0.1 to 5.0 percent of the weight of the alcohol. Percentages greater than 5 percent may be used although yields are not substantially increased.

Examples of the preparation of 1,1,1-trinitro-2-chlorethane are as follows:

*Example 3*

To 30 gm. of 1,1,1-trinitro-2-hydroxyethane in a round bottom flask, fitted with a condenser and drying tubes, was added a solution of 0.9 gm. of anhydrous pyridinium hydrochloride in 50 ml. of thionyl chloride. This mixture was refluxed 5 hours and allowed to stand overnight. The reaction mixture was separated by fractional distillation under reduced pressure. The main fraction boiling at 62° C.–64.5° C. at 10 mm. pressure was collected; the yield of trinitroethyl chloride (1,1,1-trinitro-2-chloroethane) was 29.3 gm. (88.8%).

*Example 4*

A mixture of 68 gm. of 1,1,1-trinitro-2-hydroxyethane and 0.5 gm. of anhydrous pyridinium hydrochloride in 70 ml. of thionyl chloride was refluxed in a flask protected from moisture with a drying tube for 6 hours and allowed to stand overnight. The excess thionyl chloride was removed by distillation at atmospheric pressure and the residue poured over ice water and extracted with methylene chloride. The methylene chloride layer was separated, washed with cold water, dried over anhydrous magnesium sulfate, and fractionated under reduced pressure. The yield of 1,1,1-trinitro-2-chloroethane was 61 gm. (80%), B.P. 109° C.–110° C. (60 mm.); 64° C.–65° C. (20 mm.).

*Example 5*

To a mixture of 100 gm. of trinitroethyl alcohol and 100 ml. of thionyl chloride was added a solution of 1.0 gm. of pyridine in 20 ml. of thionyl chloride. This mixture of trinitroethanol and the pyridinium complex of thionyl chloride was refluxed 6 hours. Upon fractionation of the reaction mixture there was obtained 99.0 gm. (90%) of trinitroethyl chloride, B.P. 70° C. (10 mm.).

*Example 6*

A solution of 1 gm. of 3-picoline in 20 ml. of thionyl chloride was added to 20 gm. of trinitroethyl alcohol and this mixture refluxed for 5 hours and allowed to stand overnight. Fractionation at reduced pressure gave 11.8 gm. of trinitroethyl chloride, B.P. 65° C.–68° C. (10 mm.).

*Example 7*

A solution of 1 gm. of quinoline in 20 ml. of thionyl chloride was added to 20 gm. of tetrainitroethane and refluxed 5 hours. After standing overnight the mixture was fractionated giving 10.8 gm. of trinitroethyl chloride, B.P. 67° C.–68° C. (10 mm.).

*Example 8*

A mixture of 12.4 gm. of trinitroethyl sulfite and 0.5 gm. of anhydrous pyridinium hydrochloride in 25 ml. of thionyl chloride was refluxed 16 hours. Fractionation gave 10.8 gm. (92%) of trinitroethyl chloride, B.P. 60° C.–62° C. (7 mm.).

It is noted that applicants use anhydrous pyridinium hydrochloride, or small amounts of pyridine, quinoline, or 3-picoline dissolved in thionyl chloride in catalytic amounts and that the trinitroethyl alcohol is not treated with nor dissolved in larger amounts of, for example pyridine.

The important part of this reaction relates to the fact the the free base cannot be added directly so the alcohol.

It is noted that the same general process is used in preparing 1,2-dichloro-1,1-dinitroethane:

*Example 9*

A mixture of 36.3 gm. of 1-chloro-1,1-dinitro-2-hydroxyethane and a solution of 1 gm. of anhydrous pyridinium hydrochloride in 50 ml. of thionyl chloride was refluxed 24 hours. Fractionation of the reaction product at reduced pressure gave 33.5 gm. (83%) of 1,2-dichloro-1,1-dinitroethane.

*Example 10*

A mixture of 1-chloro-1,1-dinitro-2-hydroxyethane (63 gm.) and 150 ml. of thionyl chloride was refluxed with 0.5 gm. of anhydrous pyridinium hydrochloride for 20 hours. Most of the thionyl chloride was removed at reduced pressure and the residue was poured over ice. Extraction with chloroform and fractionation of the extract gave 15 gm. of 1,2-dichloro-1,1-dinitroethane.

It should be obvious that the processes for making trinitrochloroethane and 1,2-dichloro-1,1-dinitroethane are the same and the determination as to which compound is produced depends upon the starting material, i.e., 1,1,1-trinitroethanol or 1,1,1-trinitroethyl sulfite, in the case of the former, and 1-chloro-1,1-dinitro-2-hydroxyethane in the case of the latter.

As stated hereinabove an important aspect of the present invention comprises the manner in which 1,1,1-trinitro-2-chloroethane and 1,2-dichloro-1,1-dinitroethane are transformed into the dipotassium salt of 1,1,2,2-tetranitroethane. It has been found that treatment of either of these compounds with a base, preferably in the presence of nitrite ion will facilitate the transformation of the nitrochloroethane compounds to the dipotassium salt of tetranitroethane, which may then be further nitrated to hexanitroethane per the conventional processes hereinabove defined. Although the above-mentioned conversion can be made to take place in the absence of nitrite ion using, for example, a base such as potassium hydroxide, potassium iodide, or potassium acetate, the yields are much poorer than when additional nitrite ion is supplied. This is an unusual and quite unexpected rearrangement of the atoms constituting the molecules involved. While the exact mechanism of the reaction and rearrangement is not precisely known, it is important to note that the reaction is fairly smooth and that the yields obtained are good.

Examples of the preparation of the dipotassium salt of tetranitroethane are presented hereinbelow:

Example 11

5 gm. of trinitroethyl chloride was added to a solution of 10 gm. of potassium nitrite in 50 ml. of methanol and 12 ml. of water. A solution of 1.4 gm. of potassium hydroxide in 1 ml. of water and 3 ml. of methanol was added to this solution; the temperature rose to 35° C. The reaction mixture was stirred overnight at room temperature. The yellow precipitate was collected, washed with methanol and air dried. The yield of dipostassium tetranitroethane, M.P. 289° C.–292° C. (decomposes), was 5.8 gm. (81%).

Example 12

To a solution of 12.8 gm. of potassium nitrite and 15 gm. of potassium acetate in 60 ml. of dilute methanol (40 ml. methanol+20 ml. water) cooled to 5° C., was added 10 gm. of trinitroethyl chloride. To this solution was added a solution of 1 gm. of potassium hydroxide in a mixture of 2 ml. water and 5 ml. methanol with vigorous stirring. After 2 hours' stirring at 5° C., the reaction was allowed to stand overnight and the precipitate collected. There was obtained 14.4 gm. of dipotassium tetranitroethane.

Example 13

To a solution of 0.01 mole trinitroethyl chloride and 0.094 mole potassium nitrite in 30 ml. aqueous methanol (40/60) was added a solution 0.01 mole potassium acetate in 5 ml. aqueous methanol at room temperature. The resulting solution was allowed to stand 24 hours. The precipitate was collected then washed with two portions of methanol. The yield of dipotassium tetranitroethane was 2.40 gm. (83.9%), M.P. 293° C.–294° C. (decomposes).

Example 14

A solution of 0.01 mole trinitroethyl chloride and 0.094 mole potassium nitrite in 25 ml. aqueous methanol (40/60) was allowed to stand 24 hours at room temperature. The precipitate was collected and washed with 2 portions of methanol. The yield of dipotassium tetranitroethane was 2.60 gm. (90.9%), M.P. 293° C.–294° C. (decomposes).

Example 15

A solution of 0.01 mole trinitroethyl chloride and 0.14 mole sodium nitrite in 25 ml. 60% aqueous methanol was allowed to stand at room temperature for 24 hours. To the resulting clear orange solution was added a solution of 0.02 mole potassium nitrite in water. The product which precipitated immediately was collected and washed with 2 portions of methanol. The yield of dipotassium tetranitroethane was 1.79 gm. (62.6%).

Example 16

To a solution of 0.01 mole trinitroethyl chloride and 0.04 mole potassium nitrite in 60% aqueous methanol was added a solution of 0.041 mole potassium acetate in 5 ml. 60% aqueous methanol. After standing 24 hours the mixture was filtered and the precipitate washed with 2 portions of methanol. The yield was 2.43 gm. of dipotassium tetranitroethane (85%).

Example 17

To a solution of 0.01 mole trinitroethyl chloride and 0.04 mole potassium nitrite in 15 ml. aqueous methanol was added, with cooling, a solution of 0.02 mole potassium cyanide in 5 ml. aqueous methanol. After standing 24 hours the precipitate was collected and washed with 2 portions of methanol. The yield of dipotassium tetranitroethane was 1.79 gm. (62.6%).

Example 18

To a solution of 0.01 mole trinitroethyl chloride and 0.04 mole potassium nitrite in 15 ml. 60% aqueous methanol was added a solution of 0.04 mole potassium iodide in 5 ml. 60% aqueous methanol. After standing 24 hours, the product was collected and washed with 2 portions methanol. The yield of dipotassium tetranitroethane was 1.82 gm. (63.6%).

Example 19

To a solution of 0.01 mole trinitroethyl chloride and 0.04 mole of potassium nitrite in 15 ml. of 60% aqueous methanol was added a solution of 5 ml. aqueous methanol saturated with ammonia gas. The mixture was allowed to stand 24 hours. The precipitate was collected and washed with 2 portions of methanol. The yield of crude dipotassium tetranitroethane was 1.93 gm. (67.5%) (contaminated with some potassium dinitromethane). Recrystallization from dilute methanol gave 1.52 gm. (53%) of pure dipotassium tetranitroethane.

Example 20

To a solution of 6 gm. of potassium hydroxide and 12 gm. of potassium nitrite in 50 ml. of 60% aqueous methanol was added slowly at 3° C. 6 gm. of 1,2-dichloro-1,1-dinitroethane. After 3 gm. had been added, the temperature rose to 19° C. The reaction mixture was allowed to stand in the refrigerator overnight. The precipitate was collected, washed with cold 60% methanol and dried in vacuo. The yield of dipotassium tetranitroethane was 2 gm., M.P. 289° C.–292° C. (with decomposition).

Example 21

To a solution of 0.094 mole of potassium nitrite and 0.01 mole of 1,2-dichloro-1,1-dinitroethane in 30 ml. of 60% aqueous methanol was added 0.02 mole of potassium hydroxide in 5 ml. of 60% aqueous methanol. After standing at room temperature overnight, the precipitate was collected. The yield of dipotassium tetranitroethane was 0.66 gm.

Example 22

10 gm. of sodium nitrite was dissolved in 100 ml. of methanol and 10 ml. of water by slight warming. To this solution was added 4 gm. of trinitroethyl chloride and the reaction allowed to stand overnight. Upon evaporation of the solvent in vacuo and fractionally crystallizing the dry residue, there was obtained 2.54 gm. (49.6%) of yellow salt, M.P. 270° C.–272° C. (decomposes). Analytical results and infrared confirm the structure as the disodium salt of tetranitroethane.

Example 23

To a solution of 0.01 mole of 1,2-dichloro-1,1-dinitroethane and 0.04 mole of potassium nitrite in 20 ml. of 60% aqueous methanol was added a solution of 0.02 mole of potassium iodide in 10 ml. of 60% aqueous methanol. After standing several hours at room temperature, the precipitate was separated. The yield of dipotassium tetranitroethane was 1.83 gm. It is noted that dipotassium tetranitroethane is a yellow-orange crystalline solid with a melting point of 293° C.–294° C. (decomposes).

Applicants intend that their invention be given the broadest interpretation within the scope of the appended claims and that the invention be understood to include technical equivalents as well as modifications that would normally occur to one skilled in the art.

We claim:
1. 1,1,1-trinitro-2-chloroethane.
2. The method of preparing 1,1,1-trinitro-2-chloroethane comprising the steps of reacting 1,1,1-trinitro-2-hydroxyethane with a solution of thionyl chloride in which is dissolved a catalytic amount of a compound selected from the group consisting of the hydrochloride of a base of the pyridine class and a base of the pyridine class.

3. The method of preparing 1,1,1-trinitro-2-chloroethane as claimed in claim 2 in which said base is anhydrous pyridinium hydrochloride.

4. The method of preparing 1,1,1-trinitro-2-chloroethane as claimed in claim 2 in which said base is quinoline hydrochloride.

5. The method of preparing 1,1,1-trinitro-2-chloroethane as claimed in claim 2 in which said base is 3-picoline.

6. The method of preparing 1,1,1-trinitro-2-chloroethane as claimed in claim 2 in which said base is pyridine.

7. The method of preparing 1,1,1-trinitro-2-chloroethane comprising the steps of adding to 1,1,1-trinitro-2-hydroxyethane a solution of thionyl chloride containing catalytic amounts of a compound selected from the group consisting of a hydrochloride of a base of the pyridine class and a base of the pyridine class, refluxing the alcohol and said solution for a period of time necessary to complete the reaction therebetween, and separating 1,1,1-trinitro-2-chloroethane from the reaction mixture.

8. The method of preparing 1,1,1-trinitro-2-chloroethane as claimed in claim 7 in which said base is present in said thionyl chloride solution in a range of approximately 0.1 to approximately 5.0 percent by weight of the 1,1,1-trinitro-2-hydroxyethane.

9. The method of preparing 1,1,1-trinitro-2-chloroethane as claimed in claim 7 in which said base is anhydrous pyridinium hydrochloride.

10. 1,1-dinitro-1,2-dichloroethane.

11. The method of preparing 1,1-dinitro-1,2-dichloroethane which comprises the steps of reacting 1-chloro-1,1-dinitro-2-hydroxyethane with a solution of thionyl chloride in which is dissolved a catalytic amount of a compound selected from the group consisting of the hydrochloride of a base of the pyridine class and a base of the pyridine class.

12. The method of preparing 1,1-dinitro-1,2-dichloroethane as claimed in claim 11 in which said base is anhydrous pyridinium hydrochloride.

13. The method of preparing 1,1,1-trinitro-2-chloroethane as claimed in claim 11 in which said base is quinoline hydrochloride.

14. The method of preparing 1,1,1-trinitro-2-chloroethane as claimed in claim 11 in which said base is 3-picoline.

15. The method of preparing 1,1,1-trinitro-2-chloroethane as claimed in claim 11 in which said base is pyridine.

16. The method of preparing 1,1-dinitro-1,2-dichloroethane which comprises the steps of adding to 1-chloro-1,1-dinitro-2-hydroxyethane a solution of thionyl chloride containing catalytic amounts of a compound selected from the group consisting of the base of a hydrochloride of the pyridine class and a base of the pyridine class refluxing the alcohol and said solution to allow the reaction to proceed to completion, and separating 1,1-dinitro-1,2-dichloroethane from the reaction mixture.

17. The method of preparing 1,1-dinitro-1,2-dichloroethane as claimed in claim 16 in which said base is anhydrous pyridinium hydrochloride and is present in an amount ranging from approximately 0.1 to approximately 5.0 percent by weight of said 1,1-dinitro-1,2-dichloroethane.

18. The method of preparing the dipotassium salt of 1,1,2,2-tetranitroethane which comprises the steps of reacting a compound selected from the group consisting of 1,1,1-trinitro-2-chloroethane and 1,1-dinitro-1,2-dichloroethane with a compound selected from the group consisting of KI, KCN, KOH, $KNO_2$, and mixtures thereof, and removing the reaction product of dipotassium tetranitroethane.

19. The method of preparing the dipotassium salt of 1,1,2,2-tetranitroethane which comprises the steps of mixing a compound selected from the group consisting of 1,1,1-trinitro-2-chloroethane and 1,1-dinitro-1,2-dichloroethane with potassium nitrite in an aqueous solution of alcohol, adding a base selected from the group consisting of KI, KCN, KOH, $KNO_2$, and mixtures thereof to said solution and, after allowing the reaction to take place, removing the reaction product of dipotassium tetranitroethane.

20. The method of preparing the dipotassium salt of 1,1,2,2-tetranitroethane which comprises the steps of reacting a compound selected from the group consisting of 1,1,1-trinitro-2-hydroxyethane and 1-chloro-1,1-dinitro-2-hydroxyethane with a solution of thionyl chloride in which is dissolved a catalytic amount of a compound selected from the group consisting of the hydrochloride of the base of a pyridine class and a base of the pyridine class, reacting the major reaction product thus obtained with a base selected from the group consisting of KI, KCN, KOH, $KNO_2$, and mixtures thereof, and removing the reaction product of dipotassium tetranitroethane therefrom.

No references cited.

CARL D. QUARFORTH, *Primary Examiner.*

OSCAR R. VERTIZ, *Examiner.*